US009413747B2

(12) United States Patent
Grigg et al.

(10) Patent No.: US 9,413,747 B2
(45) Date of Patent: *Aug. 9, 2016

(54) SHUTTING DOWN ACCESS TO ALL USER ACCOUNTS

(71) Applicant: Bank of America Corporation, Charlotte, NC (US)

(72) Inventors: David M. Grigg, Rock Hill, SC (US); Hood Qaim-Maqami, Montclair, NJ (US); Alicia C. Jones, Fort Mill, SC (US); Elizabeth S. Votaw, Potomac, MD (US); Joseph Neil Johansen, Rock Hill, SC (US); Charles Jason Burrell, Middleburg, FL (US); Carrie Anne Hanson, Charlotte, NC (US); Michael Patrick Lynch, Jacksonville, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,269

(22) Filed: Feb. 18, 2016

(65) Prior Publication Data

US 2016/0164858 A1    Jun. 9, 2016

Related U.S. Application Data

(63) Continuation of application No. 14/175,136, filed on Feb. 7, 2014.

(51) Int. Cl.
*H04L 29/06* (2006.01)
*G06Q 40/02* (2012.01)

(52) U.S. Cl.
CPC ............... *H04L 63/08* (2013.01); *G06Q 40/02* (2013.01)

(58) Field of Classification Search
CPC ....... G06F 21/10; G06F 21/62; G06F 21/335; G06F 2221/2117; G06F 2221/2141; G06F 2221/2119; H04L 63/105; H04L 63/08
See application file for complete search history.

(56) References Cited

U.S. PATENT DOCUMENTS

| | | |
|---|---|---|
| 5,437,346 A | 8/1995 | Dumont |
| 6,256,670 B1 | 7/2001 | Davies |
| 7,111,323 B1 | 9/2006 | Bhatia et al. |
| 7,231,202 B2 | 6/2007 | Natsuno |
| 7,239,226 B2 | 7/2007 | Berardi et al. |

(Continued)

OTHER PUBLICATIONS

Office Action dated Aug. 27, 2015 for U.S. Appl. No. 14/175,701.

(Continued)

*Primary Examiner* — Amir Mehrmanesh
(74) *Attorney, Agent, or Firm* — Michael A. Springs; Moore & Van Allen PLLC; W. Kevin Ransom

(57) ABSTRACT

Disclosed is a system and associated method or restricting access to a user's account via one or more account access channels. The system typically includes a processor, a memory, and an access restriction module stored in the memory. The module is typically configured for: integrating one or more account access channels associated with the user's account with an access restriction procedure; receiving a request from the user to implement the access restriction procedure; based on receiving the request from the user to implement the access restriction procedure, implementing the access restriction procedure, wherein implementing the access restriction procedure comprises restricting access to the user's account via the account access channel(s).

20 Claims, 6 Drawing Sheets

(56) References Cited

U.S. PATENT DOCUMENTS

| | | | |
|---|---|---|---|
| 7,373,515 | B2 | 5/2008 | Owen et al. |
| 7,472,081 | B1 | 12/2008 | Cason |
| 7,529,741 | B2 | 5/2009 | Aravamudan et al. |
| 7,546,276 | B2 | 6/2009 | Randle et al. |
| 7,599,287 | B2 | 10/2009 | Testa et al. |
| 7,697,920 | B1 | 4/2010 | McClain |
| 7,716,180 | B2 | 5/2010 | Vermeulen et al. |
| 7,738,382 | B2 | 6/2010 | Le Faucheur et al. |
| 7,783,281 | B1 | 8/2010 | Cook et al. |
| 7,930,264 | B2 | 4/2011 | Geppert |
| 7,988,045 | B2 | 8/2011 | Connell, II et al. |
| 8,012,219 | B2 * | 9/2011 | Mendez ............ G06F 21/62 455/419 |
| 8,156,335 | B2 | 4/2012 | Lin |
| 8,165,945 | B2 | 4/2012 | Collins et al. |
| 8,201,232 | B2 | 6/2012 | Zhang et al. |
| 8,214,650 | B2 | 7/2012 | Dickinson et al. |
| 8,244,210 | B2 | 8/2012 | Ayanamcottil et al. |
| 8,261,093 | B1 | 9/2012 | Dhesi et al. |
| 8,270,995 | B1 | 9/2012 | Manroa et al. |
| 8,286,227 | B1 | 10/2012 | Zheng |
| 8,295,812 | B1 | 10/2012 | Jones |
| 8,295,898 | B2 | 10/2012 | Ashfield et al. |
| 8,307,412 | B2 | 11/2012 | Ozzie et al. |
| 8,332,272 | B2 | 12/2012 | Fisher |
| 8,352,323 | B2 | 1/2013 | Fisher |
| 8,352,730 | B2 | 1/2013 | Giobbi |
| 8,369,833 | B2 | 2/2013 | McClain |
| 8,380,177 | B2 | 2/2013 | Laracey |
| 8,412,626 | B2 | 4/2013 | Hirson et al. |
| 8,423,466 | B2 | 4/2013 | Lanc |
| 8,442,915 | B2 | 5/2013 | Takatori et al. |
| 8,483,194 | B1 | 7/2013 | Wu et al. |
| 8,483,663 | B1 | 7/2013 | Jones |
| 8,485,438 | B2 | 7/2013 | Dollard |
| 8,601,602 | B1 | 12/2013 | Zheng |
| 8,644,506 | B2 | 2/2014 | Zellner |
| 8,660,358 | B1 | 2/2014 | Bergboer et al. |
| 8,683,571 | B2 | 3/2014 | Zapata et al. |
| 8,744,968 | B1 | 6/2014 | Grigg et al. |
| 8,768,838 | B1 * | 7/2014 | Hoffman ............ G06Q 40/00 705/44 |
| 8,769,270 | B2 | 7/2014 | Orsini et al. |
| 8,869,241 | B2 | 10/2014 | Davis et al. |
| 8,869,305 | B1 | 10/2014 | Huang |
| 8,881,306 | B2 | 11/2014 | Feldman et al. |
| 8,930,271 | B1 | 1/2015 | Ellis et al. |
| 8,973,102 | B2 | 3/2015 | Jakobsson |
| 2001/0049711 | A1 | 12/2001 | Nishihara |
| 2002/0077978 | A1 | 6/2002 | O'Leary et al. |
| 2002/0157029 | A1 | 10/2002 | French et al. |
| 2002/0174073 | A1 | 11/2002 | Nordman et al. |
| 2003/0065805 | A1 | 4/2003 | Barnes, Jr. |
| 2006/0030333 | A1 | 2/2006 | Ward et al. |
| 2007/0094152 | A1 | 4/2007 | Bauman et al. |
| 2007/0100773 | A1 * | 5/2007 | Wallach ............ G06Q 20/382 705/75 |
| 2007/0113275 | A1 | 5/2007 | Khanna |
| 2007/0156842 | A1 | 7/2007 | Vermeulen et al. |
| 2007/0168677 | A1 | 7/2007 | Kudo et al. |
| 2007/0219984 | A1 | 9/2007 | Aravamudan et al. |
| 2007/0250920 | A1 * | 10/2007 | Lindsay ............ G06F 21/31 726/7 |
| 2007/0277232 | A1 | 11/2007 | Cates et al. |
| 2008/0293397 | A1 | 11/2008 | Gajdos et al. |
| 2009/0019534 | A1 * | 1/2009 | Bakshi ............ G06F 21/335 726/6 |
| 2009/0076965 | A1 | 3/2009 | Elson et al. |
| 2009/0100529 | A1 * | 4/2009 | Livnat ............ G06F 21/10 726/28 |
| 2009/0150286 | A1 * | 6/2009 | Barton ............ G06Q 20/10 705/44 |
| 2009/0187492 | A1 | 7/2009 | Hammad et al. |
| 2009/0199264 | A1 | 8/2009 | Lang |
| 2009/0217346 | A1 | 8/2009 | Manring et al. |
| 2009/0254975 | A1 | 10/2009 | Turnbull et al. |
| 2010/0100897 | A1 | 4/2010 | Manuel-Devadoss |
| 2010/0122333 | A1 | 5/2010 | Noe |
| 2010/0330958 | A1 | 12/2010 | Corda et al. |
| 2011/0016534 | A1 | 1/2011 | Jakobsson et al. |
| 2011/0137804 | A1 | 6/2011 | Peterson |
| 2011/0142234 | A1 | 6/2011 | Rogers |
| 2011/0159846 | A1 | 6/2011 | Kemshall |
| 2011/0167440 | A1 | 7/2011 | Greenfield |
| 2011/0208601 | A1 | 8/2011 | Ferguson et al. |
| 2011/0270618 | A1 | 11/2011 | Banerjee et al. |
| 2011/0320296 | A1 | 12/2011 | Edwards |
| 2012/0054057 | A1 | 3/2012 | O'Connell et al. |
| 2012/0089514 | A1 | 4/2012 | Kraemling et al. |
| 2012/0095916 | A1 | 4/2012 | Dorsey et al. |
| 2012/0120880 | A1 | 5/2012 | Lee et al. |
| 2012/0137340 | A1 | 5/2012 | Jakobsson et al. |
| 2012/0144468 | A1 | 6/2012 | Pratt et al. |
| 2012/0160912 | A1 | 6/2012 | Laracey |
| 2012/0173551 | A1 | 7/2012 | Haddorp et al. |
| 2012/0174237 | A1 | 7/2012 | Krzyzanowski |
| 2012/0197743 | A1 | 8/2012 | Grigg et al. |
| 2012/0230539 | A1 | 9/2012 | Calman et al. |
| 2012/0239576 | A1 | 9/2012 | Rose et al. |
| 2012/0254941 | A1 | 10/2012 | Levien et al. |
| 2012/0254943 | A1 | 10/2012 | Li |
| 2012/0265585 | A1 | 10/2012 | Muirbrook et al. |
| 2012/0300938 | A1 | 11/2012 | Kean et al. |
| 2012/0316963 | A1 | 12/2012 | Moshfeghi |
| 2013/0007874 | A1 | 1/2013 | Purvis |
| 2013/0013498 | A1 | 1/2013 | Fisher et al. |
| 2013/0030882 | A1 | 1/2013 | Davis, III et al. |
| 2013/0030931 | A1 | 1/2013 | Moshfeghi |
| 2013/0031003 | A1 | 1/2013 | Dorsey et al. |
| 2013/0031004 | A1 | 1/2013 | Dorsey et al. |
| 2013/0042314 | A1 | 2/2013 | Kelley |
| 2013/0097682 | A1 | 4/2013 | Zeljkovic et al. |
| 2013/0097683 | A1 | 4/2013 | Davis et al. |
| 2013/0097684 | A1 | 4/2013 | Kim |
| 2013/0102283 | A1 | 4/2013 | Lau et al. |
| 2013/0111208 | A1 | 5/2013 | Sabin et al. |
| 2013/0143621 | A1 | 6/2013 | Kumaran |
| 2013/0167207 | A1 | 6/2013 | Davis et al. |
| 2013/0173456 | A1 | 7/2013 | Grigg et al. |
| 2013/0178233 | A1 | 7/2013 | McCoy et al. |
| 2013/0188485 | A1 | 7/2013 | Midani et al. |
| 2013/0198056 | A1 | 8/2013 | Aldrey et al. |
| 2013/0219454 | A1 | 8/2013 | Hewinson |
| 2013/0267204 | A1 | 10/2013 | Schultz et al. |
| 2013/0290361 | A1 | 10/2013 | Anderson et al. |
| 2014/0130127 | A1 | 5/2014 | Toole et al. |
| 2014/0172707 | A1 | 6/2014 | Kuntagod |
| 2014/0173704 | A1 | 6/2014 | Adams et al. |
| 2014/0208401 | A1 | 7/2014 | Balakrishnan et al. |
| 2014/0279270 | A1 | 9/2014 | Bertanzetti et al. |
| 2014/0289821 | A1 | 9/2014 | Wilson |
| 2014/0310764 | A1 | 10/2014 | Tippett et al. |
| 2014/0315159 | A1 | 10/2014 | Mukherjee et al. |
| 2015/0032621 | A1 | 1/2015 | Kar et al. |
| 2015/0039601 | A1 | 2/2015 | Harrang et al. |
| 2015/0120572 | A1 | 4/2015 | Slade |
| 2015/0213474 | A1 | 7/2015 | Howe |

OTHER PUBLICATIONS

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2013.

(56) References Cited

OTHER PUBLICATIONS

QThru.com. "QThru: use your mobile smartphone for self-checkout." http://www.qthru.com/. QThru.com © 2011. 6 pages. Retrieved Mar. 22, 2013.

Zimmerman, Ann. "Check Out the Future of Shopping: Shaving Time Off the Weekly Grocery Run to Keep Consumers in Stores and Spending." http://online.wsj.com/ article/ SB10001424052748703421204576329253050637400.html. 5 pages. Retrieved Mar. 22, 2013.

* cited by examiner

SHUTTING DOWN ACCESS TO ALL USER ACCOUNTS

CROSS-REFERENCE OF RELATED APPLICATIONS

This application is a continuation of U.S. patent application Ser. No. 14/175,136, filed Feb. 7, 2014, which is hereby incorporated by reference in its entirety.

FIELD OF THE INVENTION

The present invention embraces a system for restricting access to a user's account via one or more account access channels. The system typically includes a processor, a memory, and an access restriction module stored in the memory. The access restriction module is typically configured to allow the user to restrict access to the account via one or more account access channels.

BACKGROUND

Over the last few years, there has been a proliferation of ways to access a user's bank account, including via a debit card, credit card, mobile wallet, online or mobile banking, or automated teller machine (ATM). That said, a need exists for users to be able restrict access to their accounts if a way of accessing their accounts becomes compromised.

SUMMARY

In one aspect, the present invention embraces a method of restricting access to a user's account via one or more account access channels. The present invention also embraces a system configured for performing one or more of the steps of the method.

The method typically includes: integrating a first account access channel associated with the user's account with a first access restriction procedure; receiving a request from the user to implement the first access restriction procedure; and, based on receiving the request from the user to implement the first access restriction procedure, implementing the first access restriction procedure, wherein implementing the first access restriction procedure includes restricting access to the user's account via the first account access channel.

In a particular embodiment, the method includes: based on receiving the request from the user to implement the first access restriction procedure, prompting the user to provide predefined authentication information; and receiving the predefined authentication information from the user; wherein implementing the first access restriction procedure is further based on receiving the predefined authentication information from the user.

In another particular embodiment, the method includes: integrating a second account access channel associated with the user's account with the first access restriction procedure; wherein implementing the first access restriction procedure includes restricting access to the user's account via the second account access channel.

In yet another particular embodiment, the method includes: integrating a second account access channel associated with the user's account with a second access restriction procedure; receiving a request from the user to implement the second access restriction procedure; and, based on receiving the request from the user to implement the second access restriction procedure, implementing the second access restriction procedure, wherein implementing the second access restriction procedure includes restricting access to the user's account via the second account access channel.

In yet another particular embodiment, the method includes: graphically presenting a first access restriction button to the user via an online banking interface or an automated teller machine interface; wherein receiving the request from the user to implement the first access restriction procedure includes determining that the user has engaged the first access restriction button via the online banking interface or the automated teller machine interface.

In yet another particular embodiment, restricting access to the user's account via the first account access channel includes disabling access to the user's account via the first account access channel.

In yet another particular embodiment, restricting access to the user's account via the first account access channel includes implementing an authentication procedure that requires secondary authentication before permitting access to the user's account via the first account access channel.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
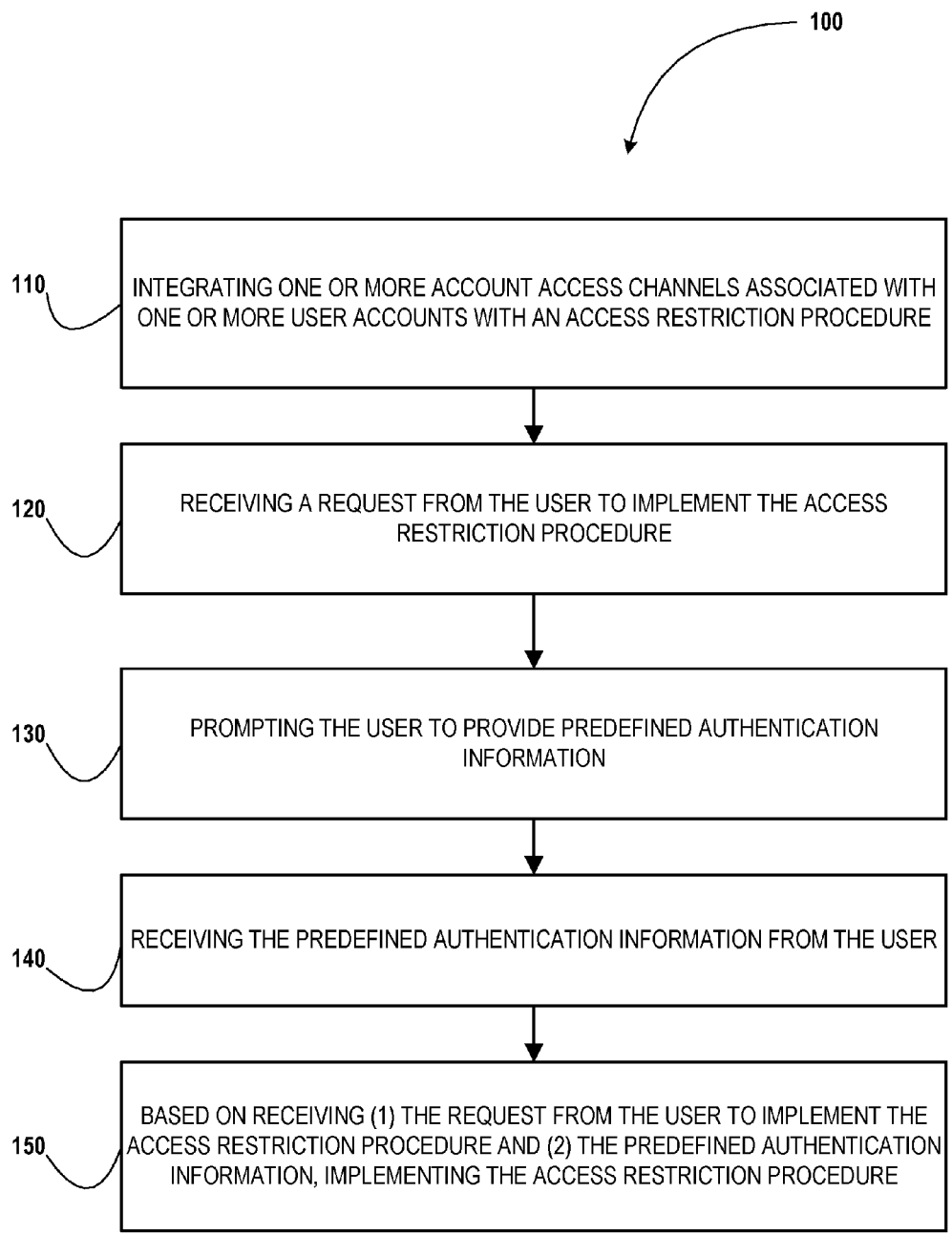
Figure 2:
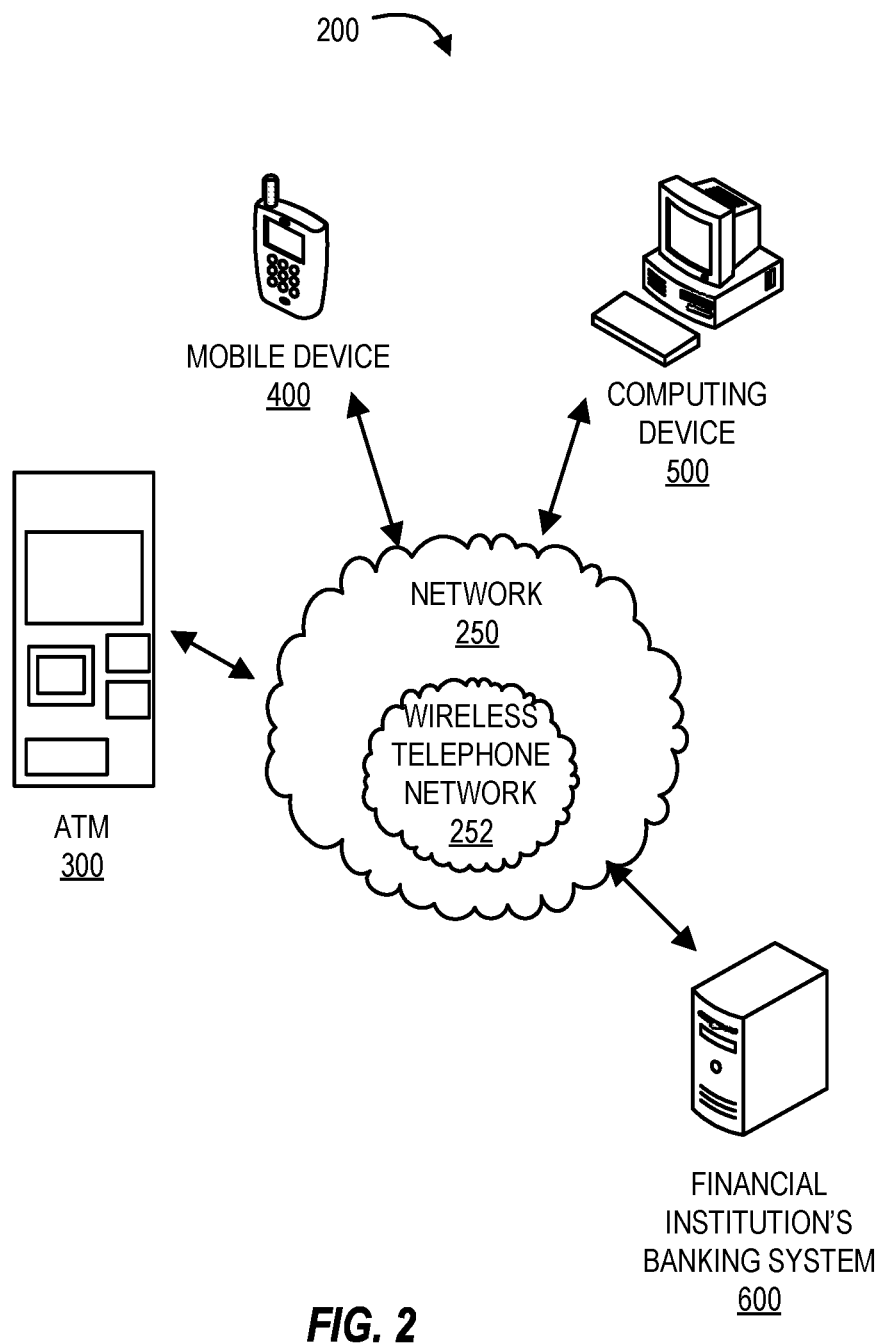
Figure 3:
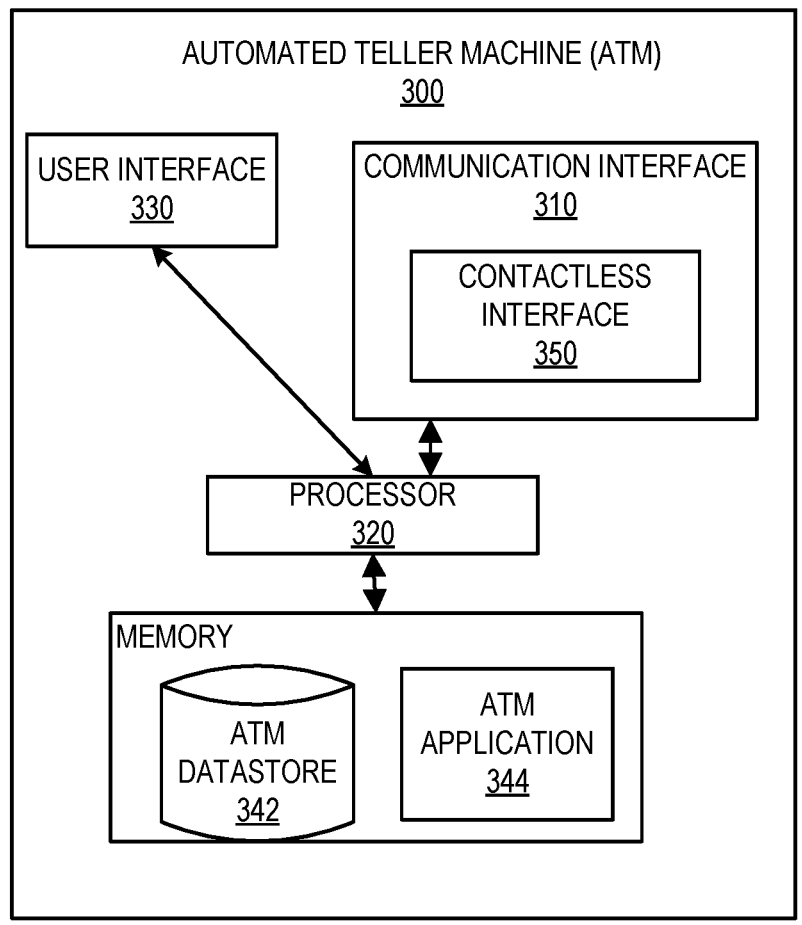
Figure 4:
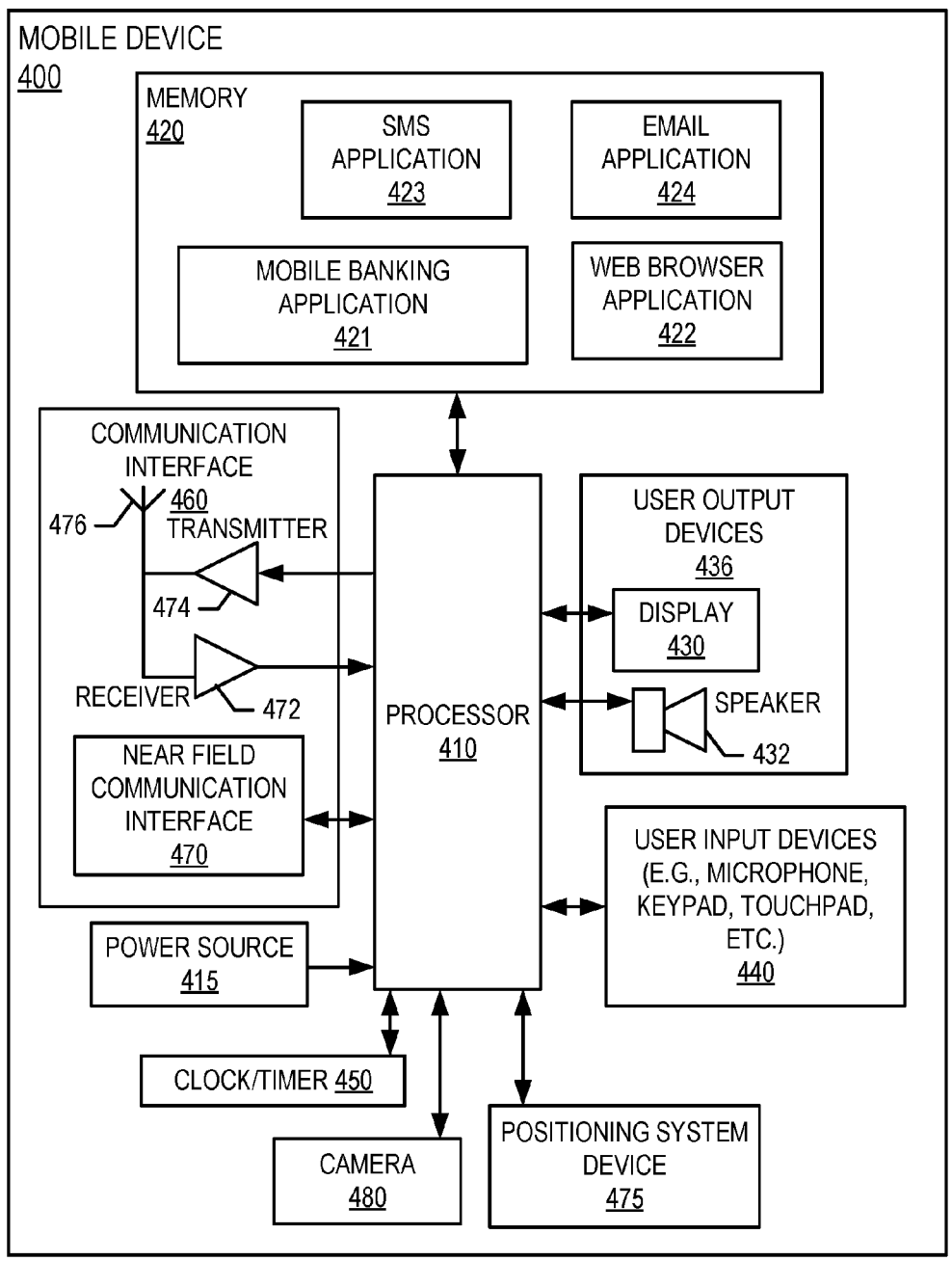
Figure 5:
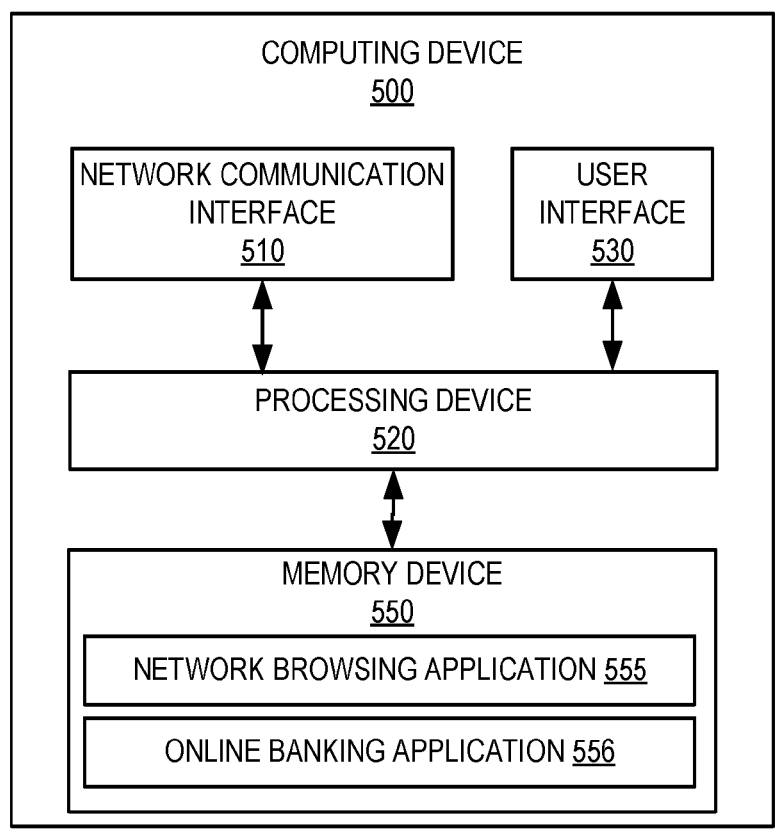
Figure 6:
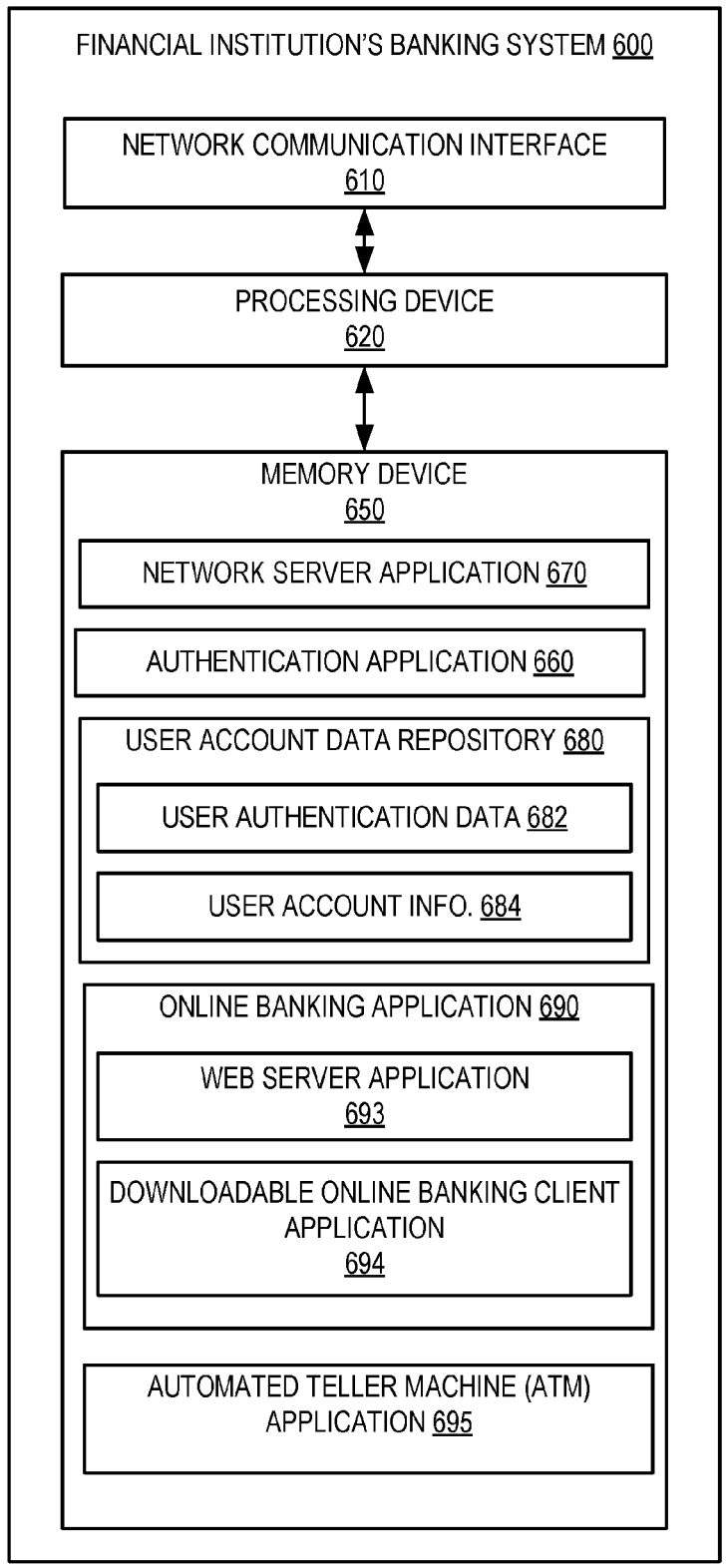

Having thus described embodiments of the invention in general terms, reference will now be made the accompanying drawings, wherein:

FIG. 1 depicts a method for restricting access to a user's account(s) via one or more account access channels in accordance with an aspect of the present invention;

FIG. 2 depicts a banking system and environment in accordance with an aspect of the present invention;

FIG. 3 schematically depicts an automated teller machine in accordance with an aspect of the present invention;

FIG. 4 schematically depicts a user's mobile device in accordance with an aspect of the present invention;

FIG. 5 schematically depicts a user's computing device in accordance with an aspect of the present invention; and FIG. 6 schematically depicts a banking system in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

As used herein, an "online banking account" is an account that is associated with one or more user accounts at a financial institution. For example, the user may have an online banking account that is associated with the user's checking account, savings account, investment account, and/or credit account at a particular financial institution. A username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

As used herein, an "account access channel" is any way in which an account holder can access his or her account (e.g., make payments or purchases, transfer funds, pay bills, withdraw funds, deposit funds, view account balances, view transaction history, view statements, and the like). By way of example, an account access channel may be the account holder's debit card and/or any associated debit card information (e.g., card number, expiration date, account holder name, security code, and/or personal identification number (PIN)). An account access channel may be the account holder's credit card and/or any associated credit card information (e.g., account number, expiration date, account holder name, address, zip code, and/or security code). An account access channel may be the account holder's online banking account that is associated with the holder's account(s) and/or any information needed to access the online banking account, such as a username, password, and any other login or authentication information. An account access channel may be a mobile device (e.g., a laptop, personal digital assistant (PDA), cell phone, smart phone, tablet, mp3 player, or any other suitable electronic device) or other computing device (e.g., personal computer) that the account holder regularly uses to access the account (e.g., via online banking or a mobile wallet). An account access channel may be the account holder's ATM card or bank card and/or any associated card information (e.g., card number and/or PIN), which the account holder may use to access his or her account (e.g., via an ATM). An account access channel may be the account holder's checks associated with the account and associated information that could be used for an electronic check. By way of further example, an account access channel may by any information need to engage in a wire transfer or electronic funds transfer.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded). In other embodiments, the "customer" may refer to the user.

In one aspect, the present invention generally relates to a system for restricting access to a user's account(s) via one or more account access channels. More particularly, the user may discover that one or more account access channels have been compromised (e.g., lost or misappropriated). For example, the user may lose a debit card or mobile device. Based on such account access channel being compromised, the user may request that access to the user's account(s) via such account access channel be restricted. Based on such request, the system may prevent such account access channel from being used to access the user's account(s) or otherwise restrict access to the user's account(s).

Referring now to FIG. 1, a general process flow 100 is provided for restricting access to a user's account(s) via one or more account access channels.

At block 110, the method includes integrating one or more account access channels associated with one or more user accounts with an access restriction procedure. The step of integrating the access channels with the access restriction procedure may be initiated by the user or by the entity providing the user's account(s). For example, the entity might automatically integrate issued debit cards, ATM cards, credit cards, and online banking accounts with an access restriction procedure. Alternatively, the user might initiate the step of integrating the access channels with the access restriction procedure. In this regard, the user may initiate the step of integrating the access channels with the access restriction procedure via an online banking interface or ATM interface.

The access restriction procedure typically defines the procedure that is implemented (e.g., upon the initiation of the user) if account access channels become compromised or if the user fears the account access channels become compromised. In this regard, the access restriction procedure typically defines the extent to which access to the one or more user accounts is restricted if the account access channels become compromised or if the user fears the account access channels become compromised. In one embodiment, the access restriction procedure, once implemented, may entirely prevent the account access channels from being used to access the user's account(s). For example, if the user losers his or her debit card, then debit card and its associated information (e.g., card number) might be blocked from being used in future transaction (e.g., in-person transactions, ATM transactions, and/or online transactions). Alternatively, the access restriction procedure may restrict access to the user's account(s) via the account access channels by requiring additional authentication information before permitting access to the user's account(s). For example, if the user fears that his or her online banking username has been compromised, then the access restriction procedure might require the user to provide, in addition to the user's online banking username and password, secondary authentication information (e.g., a PIN, biometric information, such as voice authentication, a fingerprint, and/or a retina scan, or an answer to a security question) before permitting access to the user's online banking account. By way of further example, if the user fears that his or her debit card has been compromised, then the access restriction procedure might require the user to provide, in addition to the user's PIN, secondary authentication information (e.g., zip code, biometric information, such as voice authentication, a fingerprint, and/or a retina scan, or an answer to a security question) before allowing a transaction involving the debit card to be completed. Furthermore, the access restriction procedure may initiate the replacement of the account access channels. For example, if the account access channels include a debit card or credit card, then the access restriction procedure may initiate the process for issuing a replacement debit or credit card. By way of further example, if the account access channels include the user's online banking account, then the access restriction procedure may initiate the process for issuing the user a new username and password for the user's online banking account. Each access restriction procedure may be defined by the user and/or by the entity.

In order to integrate the one or more account access channels with the access restriction procedure, identification information regarding one or more account access channels (e.g., information regarding the user's debit card, credit card, ATM card, mobile device, and/or online banking account) is typically received from the user or from the entity providing the user's account(s). If the account access channel is a mobile device or other computing device, the identification information may be any information sufficient to generate a device "fingerprint," or unique signature of the device. Device identification information may be collected from a variety of sources. In some embodiments, the device identification information includes an identification code. The identification code may be but is not limited to a serial number or an item number of the device. In some embodiments, the device identification information may be associated with a chip associated with the device. The chip may be but is not limited to a subscriber identification module (SIM) card, removable hard drive, processor, microprocessor, or the like. In other embodiments, the device identification information may be associated with a removable part of the device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the device. This unique key, code, or piece of software may then serve as device authentication information. In some embodiments, device identification information may need to be entered manually at the device. For example, the user may be prompted (e.g., via an online banking interface) to manually enter the device identification information (e.g., a serial number, an identification code, an International Mobile Station Equipment Identity (IMEI), a phone number, a chip, a removable part, or similar pieces of device identification information). In other embodiments, device identification information may not be based on user input received at the device. Instead, the device identification information may be automatically provided by the device. In yet another embodiment, the device may provide the information without requiring user input after receiving a request for the identification information.

This information regarding the account access channels is then associated with the access restriction procedure (e.g., by creating a record in memory associating the account access channels with the access restriction procedure).

In one embodiment, the access restriction procedure may integrated with a plurality of account access channels (e.g., all of the user's account access channels) such that if the access restriction procedure is initiated, then access to the user's account(s) from each account access channel may be restricted. In one particular embodiment, each user account may have a single access restriction procedure that is (i) linked to each of the account's access channels and (ii) configured, when initiated, to disable access to the account from each account access channel.

In an alternative embodiment, each user account may have a plurality of access restriction procedures, each of which may be integrated with different account access channels. For example, a user account may have a first access restriction procedure linked to the user's debit card, a second access restriction procedure linked to the user's online banking account, and a third access restriction procedure linked to the user's mobile device. The first access restriction procedure may be configured to disable access to the user's account via the debit card (e.g., prevent debit card transactions online, in a store, or at an ATM) or, alternatively, to require secondary authentication information. The first access restriction procedure may be further configured to automatically initiate the process for replacing the user's debit card. The second access restriction procedure may be configured to disable access to the user's online banking account or, alternatively, to require secondary authentication information before allowing access to the user's online banking account. The second access restriction procedure may be further configured to automatically initiate the process for replacing the user's online banking username and/or password. The third access restriction procedure may be configured to prevent access to the user's account via the mobile device. For example, using identification information from the mobile device, the mobile device may be prevented from accessing the user's account, such as by preventing the mobile device from logging into the customer's online banking account or being used as a mobile wallet. Furthermore, because the mobile device may have saved information related to the user's online banking account (e.g., the user's online banking username), the third access restriction procedure may be further configured to restrict access to the user's online banking account (e.g., by requiring secondary authentication information) from any device, not just the user's mobile device.

A particular mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device.

In some embodiments, an access restriction procedure is configured to restrict access to a single user account (e.g., a checking account linked to a debit card). That said, in other embodiments, an access restriction procedure may be configured to restrict access to a plurality of user accounts. For example, an access restriction procedure integrated with the user's online banking account may be configured to restrict access via the online banking account to each user account (e.g., a checking account, savings account, and credit account) linked to the online banking account.

At block 120, the method includes receiving a request from the user to implement an access restriction procedure. The request from the user to implement the access restriction procedure may be sent by the user via an online banking interface (e.g., via a mobile banking application, via a mobile banking website, or via an online banking website) or an ATM interface. In this regard, the online banking interface or ATM interface may present a graphical user interface (GUI) having an icon or button linked to the access restriction procedure, such that if the user engages the icon or button, then the online banking interface or ATM interface transmits the request to implement the access restriction procedure. For example, the online banking interface or ATM interface may present a red "Shut Down All Account Access" button linked to an access restriction procedure integrated with all of the user's account access channels. By way of further example, the online banking interface or ATM interface may present multiple buttons each linked to a different access restriction procedure integrated with a particular account access channel, such as a "Lost Debit Card" button linked to an access restriction procedure integrated with the user's debit card or a "Compromised Online Banking Account" button linked to an access restriction procedure integrated with the user's online banking account.

At block 130, optionally, the user is prompted to provide predefined authentication information (e.g., predefined by the user or by the entity). This predefined authentication information (e.g., secondary authentication information) is typically in addition to any authentication information already provided by the user (e.g., a username and password provided to initiate an online banking session or a debit/ATM card and PIN to initiate an ATM session). The predefined authentication information may be a password, a passcode, a PIN, biometric information (e.g., voice authentication, a fingerprint, and/or a retina scan), an answer to one or more security questions, the identity of a computing device being used or in the user's possession, or any other information that can be used to authenticate the identity of the user (e.g., determine that the authentication information is associated with the user) and determine that the user has authority to access the account. In one embodiment, authentication information may include a unique intrinsic user activity, such as making a predefined motion with a user device. Using a unique intrinsic user activity for authentication is described in commonly assigned U.S. Pat. No. 8,116,453, which is hereby incorporated by reference in its entirety.

Next, at block 140, the predefined authentication information is received from the user (e.g., via the online banking interface or ATM interface).

At block 150, based on (i) receiving the request from the user to implement the access restriction procedure and (ii) receiving the predefined authentication information, the access restriction procedure is implemented by restricting access (e.g., disabling access or requiring secondary authentication information) to the integrated account access channels as defined by the access restriction procedure. That said, in some embodiments, the method may not require any secondary authentication information before implementing the access restriction procedure. In such embodiments, the access restriction procedure may be implemented upon receiving the request from the user to implement the access restriction procedure.

Once the access restriction procedure has been implemented, the system may subsequently receive an indication of a transaction via a restricted account access channel. If the access restriction procedure is configured to prevent the restricted account access channel from being used to access the user's account, then the transaction would be denied. For example, a credit card transaction may be denied, or an attempt to initiate an online banking session or ATM session may be blocked.

Alternatively, if the access restriction procedure is configured to require secondary authentication before permitting access to the user's account, then, based upon receiving the indication of the transaction, the user would be presented with a request to provide such secondary authentication. For example, if the user is attempting to initiate an online banking, then the user may be prompted to answer a security question. By way of further example, if the user is attempting to engage in a credit card transaction, then the user may be prompted to provide their zip code or a PIN. Thereafter, if the correct secondary authentication information is provided, then the transaction via the restricted account access channel would be permitted. That said, if correct secondary authentication information is not provided, then the transaction via the restricted account access channel is denied or blocked.

Once the access restriction procedure has been implemented, access may be restricted pursuant to the access restriction procedure indefinitely or for a predefined period of time. If the access restriction procedure is configured to restrict access for a predefined period of time, then the access restrictions are terminated after the predefined period of time has elapsed. If the access restriction procedure is configured to restrict access for an indefinite or a predefined period of time, the access restriction procedure might be configured to be terminated if predefined authentication information is provided (e.g., a PIN, biometric information, such as voice authentication, a fingerprint, and/or a retina scan, or an answer to one or more security questions).

FIG. 2 provides a block diagram illustrating a banking system 600 and environment 200, in accordance with an embodiment of the present invention. As illustrated in FIG. 2, the banking environment 200 typically includes an automated teller machine 300, a mobile device 400, and/or a computing device 500. The computing device may be any device that employs a processor and memory and can perform computing functions, such as a personal computer or a mobile device. As used herein, a "mobile device" is any mobile communication device, such as a cellular telecommunications device (i.e., a cell phone or mobile phone), personal digital assistant (PDA), a mobile Internet accessing device, a tablet computer, a laptop, or other mobile device.

The ATM 300, mobile device 400, and the computing device 500 are typically configured to communicate over a network 250 with a financial institution's banking system 600. The ATM 300, the mobile device 400, the computing device 500, and the financial institution's banking system 600 are each described in greater detail below with reference to FIGS. 3-6. The network 250 may include a local area network (LAN), a wide area network (WAN), and/or a global area network (GAN). The network 250 may provide for wireline, wireless, or a combination of wireline and wireless communication between devices in the network. In one embodiment, the network 250 includes the Internet. In one embodiment, the network 250 includes a wireless telephone network 252.

In general, ATM 300, the mobile device 400, and/or the computing device 500 are configured to connect with the network 250 to log the user into the banking system 600. The banking system 600 involves authentication of the user in order to access the user's account on the banking system 600. For example, the banking system 600 is a system where the user logs into his/her account such that the user can access data that is associated with the user. For example, in one embodiment of the invention, the system 600 may allow the user to use the mobile device 400 or computing device 500 to log into the user's online banking account. In another embodiment, the system 600 may allow the user to access his or her account via the ATM 300. Logging into the banking system 600 generally requires that the user authenticate his/her identity using a user name, a passcode, a cookie, a biometric identifier, a PIN, a private key, a token, and/or another authentication mechanism that is provided by the user to the banking system 600 via the ATM 300, the mobile device 400, and/or the computing device 500.

The financial institution's banking system 600 is typically in network communication with other devices. In one embodiment, an application download server may be used to download online and/or mobile banking software applications that interacts with the banking system 600 to the mobile device 400 and/or computing device 500. In some embodiments of the invention, the application download server is configured to be controlled and managed by one or more third-party data providers (not shown in FIG. 2) over the network 250. In other embodiments, the application download server is configured to be controlled and managed over the network 250 by the same entity that maintains the banking system 600.

As depicted in FIG. 3, the ATM 300 typically includes a communication interface 310, a processor 320, a user interface 330, and a memory 340 having an ATM datastore 342 and an ATM application 344 stored therein. As shown, the processor 320 is operatively connected to the communication interface 310, the user interface 330, and the memory 340.

The communication interface 310 of the ATM may include a contactless interface 350. In one embodiment, the contactless interface is an NFC interface. The contactless interface 350 is configured to contactlessly and/or wirelessly send and/or receive information over relatively short ranges (e.g., within four inches, within three feet, and the like). The contactless interface 350 may include a transmitter, receiver, smart card, key card, proximity card, Bluetooth® device, radio frequency identification (RFID) tag and/or reader, and/or the like. In some embodiments, the contactless interface 350 communicates information via radio, IR, and/or optical transmissions. Generally, the contactless interface 350 is configured to operate as a contactless transmitter and/or as a contactless receiver. The contactless interface 350 functions to enable transactions with users utilizing an external apparatus capable of contactless communication. Also, it will be understood that the contactless interface 350 may be embedded, built, carried, and/or otherwise supported in and/or on the ATM 300. In some embodiments, the contactless interface 350 is not supported in and/or on the ATM 300, but the contactless interface 350 is otherwise operatively connected to the ATM 300 (e.g., where the contactless interface 350 is a peripheral device plugged into the ATM 300). The contactless interface 350 of the ATM 300 is configured to contactlessly and/or wirelessly communicate information to and/or from an external device.

The communication interface 310 may generally also include a modem, server, transceiver, and/or other device for communicating with other devices and systems (e.g., the system 600) on a network.

The user interface 330 of the ATM 300 may include a display (e.g., a liquid crystal display, a touchscreen display, and/or the like) which is operatively coupled to the processor 320. The user interface 330 may include any number of other devices allowing the ATM 300 to transmit/receive data to/from a user, such as a keypad, keyboard, touch-screen, touchpad, microphone, mouse, joystick, other pointer device, button, soft key, and/or other input device(s). For example, the user can use the user interface 330 to submit a request to implement the access restriction procedure (e.g., by pressing a button linked to the access restriction procedure).

As further illustrated in FIG. 3, the memory 340 may include ATM applications 344. It will be understood that the ATM applications 344 can be executable to initiate, perform, complete, and/or facilitate one or more portions of any embodiment described and/or contemplated herein. Generally, the ATM application 344 is executable to receive transaction instructions from the user and perform typical ATM functions, as appreciated by those skilled in the art. In some embodiments, the ATM application is configured to access content, such as data stored in memory 340, for example in the ATM datastore 342, or a database in communication with the ATM 300 and may transfer the content to an external device (e.g., a mobile device) if the external device is configured for contactless communication. The content may include coupons, ads, offers, images, financial receipts, account-related documentation, reissued account card, new account card, prepaid cards, or the like.

The ATM 300 typically requires users to identify and/or authenticate themselves to the ATM 300 before the ATM 300 will initiate, perform, complete, and/or facilitate a transaction. For example, in some embodiments, the ATM 300 is configured (and/or the ATM application 244 is executable) to authenticate an ATM user based at least partially on an ATM debit card, smart card, token (e.g., USB token, etc.), username, password, PIN, biometric information, and/or one or more other credentials that the user presents to the ATM 300. Additionally or alternatively, in some embodiments, the ATM 300 is configured to authenticate a user by using one-, two-, or multi-factor authentication. For example, in some embodiments, the ATM 300 requires two-factor authentication, such that the user must provide a valid debit card and enter the correct PIN associated with the debit card in order to authenticate the user to the ATM 300. Alternatively, the user may be able to provide their online banking username and password for authentication. The ATM 300 may prompt the user to provide further authentication information upon the user's initiation of a request to implement an access restriction procedure.

FIG. 4 provides a block diagram illustrating the mobile device 400 in more detail, in accordance with embodiments of the invention. In one embodiment of the invention, the mobile device 400 is a mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, cameras, video recorders, audio/video player, radio, GPS devices, or any combination of the aforementioned.

The mobile device 400 typically includes a processor 410 communicably coupled to such devices as a memory 420, user output devices 436, user input devices 440, a communication interface 460, a power source 415, a clock or other timer 450, a camera 480, and a positioning system device 475. The processor 410, and other processors described herein, typically includes circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device 400 to transmit and receive web content, such as, for example, location-based content and/or other web page content, according to a Wireless Application Protocol (WAP), Hypertext Transfer Protocol (HTTP), and/or the like.

The processor 410 is typically configured to use the communication interface 460 to communicate with one or more other devices on the network 250. In this regard, the communication interface 460 typically includes an antenna 476 operatively coupled to a transmitter 474 and a receiver 472 (together a "transceiver"). The processor 410 is typically configured to provide signals to and receive signals from the transmitter 474 and receiver 472, respectively. The signals may include signaling information in accordance with the air interface standard of the applicable cellular system of the wireless telephone network 252. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 400 may also be configured to operate in accordance with non-cellular communication mechanisms, such as via a wireless local area network (WLAN) or other communication/data networks.

The communication interface 460 may also include a near field communication (NFC) interface 470. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 470 may include a smart card, key card, proximity card, Bluetooth® device, radio frequency identification (RFID) tag and/or reader, transmitter, receiver, and/or the like. In some embodiments, the NFC interface 470 communicates information via radio, infrared (IR), and/or optical transmissions. In some embodiments, the NFC interface 470 is configured to operate as an NFC transmitter and/or as an NFC receiver (e.g., an NFC reader). Also, it will be understood that the NFC interface 470 may be embedded, built, carried, and/or otherwise supported in and/or on the mobile device 400. In some embodiments, the NFC interface 470 is not supported in and/or on the mobile device 400, but the NFC interface 470 is otherwise operatively connected to the mobile device 400 (e.g., where the NFC interface 470 is a peripheral device plugged into the mobile device 400). Other apparatuses having NFC interfaces mentioned herein may be configured similarly. In some embodiments, the NFC interface 470 of the mobile device 400 is configured to contactlessly and/or wirelessly communicate information to and/or from a corresponding NFC interface of another apparatus (e.g., an automated teller machine (ATM) or another mobile or computing device).

The mobile device 400 typically has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the mobile device 400 to receive data from a user such as the user, may include any of a number of devices allowing the mobile device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The mobile device 400 may also include a positioning system device 475 that is configured to be used by a positioning system to determine a location of the mobile device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the mobile device 400. In other embodiments, the positioning system device 475 includes a proximity sensor or transmitter, such as an RFID tag, that can sense or be sensed by devices known to be located proximate a location to determine that the mobile device 400 is located proximate these known devices.

The mobile device 400 further includes a power source 415, such as a battery, for powering various circuits and other devices that are used to operate the mobile device 400. Embodiments of the mobile device 400 may also include a clock or other timer 450 configured to determine and, in some cases, communicate actual or relative time to the processor 410 or one or more other devices.

The mobile device 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which include computer-executable instructions/code executed by the processor 410 to implement the functions of the mobile device 400 described herein. For example, the memory 420 may include such applications as a conventional web browser application 422 and/or a mobile banking application 421. These applications also typically provide a graphical user interface (GUI) on the display 430 that allows the user to communicate with the mobile device 400, the banking system 600, and/or other devices or systems. In one embodiment of the invention, when the user decides to enroll in an online banking program, the user downloads or otherwise obtains the mobile banking system client application from the banking system 600 or from a distinct application server. In other embodiments of the invention, the user interacts with the banking system 600 via the web browser application 422 in addition to, or instead of, the mobile banking application 421. The banking system 600 is typically configured to present a graphical user interface (e.g., through a mobile banking application or mobile banking website) that allows the user to use the mobile device 400 to control access to the user's online banking account. In this regard, the graphical user interface may include one or more buttons (e.g., "Shut Down All Account Access") linked to one or more access restriction procedures that allow the user to request that an access restriction procedure be implemented. The mobile banking application or mobile banking website may prompt the user to provide further authentication information upon the user's initiation of a request to implement an access restriction procedure.

The memory 420 can also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include such data as user authentication information.

Referring now to FIG. 5, the computing device 500 also includes various features, such as a network communication interface 510, a processing device 520, a user interface 530, and a memory device 550. The network communication interface 510 includes a device that allows the personal computing device 500 to communicate over the network 250 (shown in FIG. 2). In one embodiment of the invention, a network browsing application 555 provides for a user to establish network communication with the banking system 600 (shown in FIG. 2) for the purpose accessing a user's online banking account. In another embodiment, an online banking application 556 allows the user of the computing device 500 to a user's online banking account.

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 530 generally includes a plurality of interface devices and/or software that allow a user to input commands and data to direct the processing device to execute instructions. For example, the user interface 530 presented in FIG. 5 may include a graphical user interface (GUI) or an interface to input computer-executable instructions that direct the processing device 520 to carry out specific functions. In this regard, the graphical user interface may include one or more buttons linked to one or more access restriction procedures that allow the user to request that an access restriction procedure be implemented. The user interface 530 employs certain input and output devices to input data received from the user or output data to the user. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory device" 550 generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

FIG. 6 provides a block diagram illustrating the banking system 600 in greater detail, in accordance with an embodiment of the invention. As illustrated in FIG. 6, in one embodiment of the invention, the banking system 600 includes a processing device 620 operatively coupled to a network communication interface 610 and a memory device 650. In certain embodiments, the banking system 600 is operated by a financial institution, while in other embodiments, the banking system 600 is operated by an entity other than a financial institution.

It should be understood that the memory device 650 may include one or more databases or other data structures/repositories. The memory device 650 also includes computer-executable program code that instructs the processing device 620 to operate the network communication interface 610 to perform certain communication functions of the banking system 600 described herein. For example, in one embodiment of the banking system 600, the memory device 650 includes, but is not limited to, a network server application 670, an authentication application 660, a user account data repository 680 which includes user authentication data 680 and user account information 684, an online banking application 690 which includes a web server application 693, a downloadable online banking client application 694, an automated teller machine (ATM) application 695, and other computer-executable instructions or other data. The computer-executable program code of the network server application 670, the authentication application 660, the online banking application 690, or the automated teller machine (ATM) application 695 may instruct the processing device 620 to perform certain logic, data-processing, and data-storing functions of the banking system 600 described herein, as well as communication functions of the banking system 600. In this regard, the processing device 620 is typically configured to implement one or more access restriction procedures as described herein (e.g., by restricting access to the user's account(s) via one or more account access channels). To accomplish this, the processing device 620 may deny transactions initiated by a restricted account access channel or require secondary authentication information before permitting transactions from a restricted account access channel.

In one embodiment, the user account data repository 680 includes user authentication data 682 and user account information 684. The network server application 670, the authentication application 660, and the online banking application 690 are configured to implement user account information 684 and the user authentication data 682 (e.g., user identification information) when authenticating a user to the banking system 600. In this regard, the user authentication data 682 may include a user's username, password, PIN number, and device identification information associated with a mobile device. The user account information 684 may include account identification information. The user account data repository 680 also typically includes information regarding each access restriction procedure associated with the user's account(s).

As used herein, a "communication interface" typically includes a modem, server, transceiver, and/or other device for communicating with other devices on a network, and/or a user interface for communicating with one or more users. Referring again to FIG. 6, the network communication interface 610 is a communication interface having one or more communication devices configured to communicate with one or more other devices on the network 250, such as the ATM 300, the mobile device 400, and the computing device 500. The processing device 620 is typically configured to use the network communication interface 610 to transmit and/or receive data and/or commands to and/or from the other devices connected to the network 250.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

To supplement the present disclosure, this application further incorporates entirely by reference the following commonly assigned patent applications:

| U.S. patent application Ser. No. | Title | Filed On |
| --- | --- | --- |
| 14/175,639 (now published as U.S. patent application Publication No. 2015/0227926) | DETERMINING USER AUTHENTICATION REQUIREMENTS BASED ON THE CURRENT LOCATION OF THE USER IN COMPARISON TO A USERS'S TRAVEL ROUTE | Feb. 7, 2014 |
| 14/175,643 (now published as U.S. patent application Publication No. 2015/0227727) | DETERMINING USER AUTHENTICATION REQUIREMENTS BASED ON THE CURRENT LOCATION OF THE USER IN COMPARISON TO THE USERS'S NORMAL BOUNDARY OF LOCATION | Feb. 7, 2014 |
| 14/175,646 (now published as U.S. patent application Publication No. 2015/0227728) | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Feb. 7, 2014 |
| 14/175,701 (now published as U.S. patent application Publication No. 2015/0229623) | USER AUTHENTICATION BASED ON HISTORICAL TRANSACTION DATA | Feb. 7, 2014 |
| 14/175,947 (now published as U.S. patent application Publication No. 2015/0229624) | USER AUTHENTICATION BASED ON HISTORICAL USER BEHAVIOR | Feb. 7, 2014 |
| 14/175,954 (now published as U.S. patent application Publication No. 2015/0229650) | USER AUTHENTICATION BY GEO-LOCATION AND PROXIMITY TO USER'S CLOSE NETWORK | Feb. 7, 2014 |
| 14/175,863 (now published as U.S. patent application Publication No. 2015/0227731) | USER AUTHENTICATION BASED ON OTHER APPLICATIONS | Feb. 7, 2014 |
| 14/175,615 (now published as U.S. patent application Publication No. 2015/0227726) | USER AUTHENTICATION BASED ON FOB/INDICIA SCAN | Feb. 7, 2014 |
| 14/175,688 (now published as U.S. patent application Publication No. 2015/0227730) | USER AUTHENTICATION BASED ON SELF-SELECTED PREFERENCES | Feb. 7, 2014 |
| 14/175,672 (now published as U.S. patent application Publication No. 2015/0227729) | SELF-SELECTED USER ACCESS BASED ON SPECIFIC AUTHENTICATION TYPES | Feb. 7, 2014 |
| 14/175,146 (now published as U.S. patent application Publication No. 2015/0227725) | PROVIDING AUTHENTICATION USING PREVIOUSLY-VALIDATED AUTHENTICATION CREDENTIALS | Feb. 7, 2014 |
| 14/175,652 (now published as U.S. patent application Publication No. 2015/0227924) | DETERMINING AUTHENTICATION REQUIREMENTS ALONG A CONTINUUM BASED ON A CURRENT STATE OF THE USER AND/OR THE SERVICE REQUIRING AUTHENTICATION | Feb. 7, 2014 |
| 14/175,956 (now published as U.S. patent application Publication No. 2015/0227724) | SORTING MOBILE BANKING FUNCTIONS INTO AUTHENTICATION BUCKETS | Feb. 7, 2014 |
| 14/175,962 (now published as U.S. patent application Publication No. 2015/0229625) | AUTHENTICATION LEVEL OF FUNCTION BUCKET BASED ON CIRCUMSTANCES | Feb. 7, 2014 |
| 14/175,771 (now published as U.S. patent application Publication No. 2015/0227903) | REMOTE REVOCATION OF APPLICATION ACCESS BASED ON LOST OR MISAPPROPRIATED CARD | Feb. 7, 2014 |
| 14/175,786 (now published as U.S. patent application Publication No. 2015/0227927) | REVOCATION OF APPLICATION ACCESS BASED ON NON-CO-LOCATED | Feb. 7, 2014 |

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer program product for restricting access to a user's account via one or more account access channels, comprising a non-transitory computer-readable storage medium having computer-executable instructions for:
    integrating a first account access channel associated with the user's account with a first access restriction procedure, wherein the first access channel comprises a mobile device associated with the user's account, wherein integrating the first account access channel with the first access restriction procedure comprises integrating device identification information associated with the mobile device with the first access restriction procedure;
    integrating a third account access channel associated with the user's account with the first access restriction procedure, the third account access channel comprising an online banking account associated with the user's account;
    receiving a request from the user to implement the first access restriction procedure via a second account access channel, the second account access channel comprising an online banking interface; and
    based on receiving the request via the second account access channel from the user to implement the first access restriction procedure, implementing the first access restriction procedure, wherein implementing the first access restriction procedure comprises (i) disabling access to the user's account via the mobile device and (ii) implementing an authentication procedure that requires secondary authentication before permitting access to the user's account via the online banking account.

2. The computer program product according to claim 1, wherein the non-transitory computer-readable storage medium has computer-executable instructions for, based on receiving the request from the user to implement the first access restriction procedure, prompting the user to provide predefined authentication information.

3. The computer program product according to claim 2, wherein the non-transitory computer-readable storage medium has computer-executable instructions for receiving the predefined authentication information from the user.

4. The computer program product according to claim 3, wherein implementing the first access restriction procedure is further based on receiving the predefined authentication information from the user.

5. The computer program product according to claim 1, wherein the non-transitory computer-readable storage medium has computer-executable instructions for:
    integrating the third account access channel associated with the user's account with a second access restriction procedure;
    receiving a request from the user to implement the second access restriction procedure; and
    based on receiving the request from the user to implement the second access restriction procedure, implementing the second access restriction procedure, wherein implementing the second access restriction procedure comprises restricting access to the user's account via the third account access channel.

6. The computer program product according to claim 1, wherein the non-transitory computer-readable storage medium has computer-executable instructions for:
    graphically presenting a first access restriction button to the user via the online banking interface;
    wherein receiving the request from the user to implement the first access restriction procedure comprises determining that the user has engaged the first access restriction button via the online banking interface.

7. The computer program product according to claim 1, wherein the non-transitory computer-readable storage medium has computer-executable instructions for terminating the first access restriction procedure after a predefined period of time has elapsed.

8. The computer program product according to claim 1, wherein the mobile device is a mobile phone.

9. The computer program product according to claim 1, wherein the mobile device is a laptop computer.

10. The computer program product according to claim 1, wherein the mobile device is a tablet computer.

11. A method for restricting access to a user's account via one or more account access channels, comprising:
    integrating, with a computer processor, a first account access channel associated with the user's account with a first access restriction procedure, wherein the first access channel comprises a mobile device associated with the user's account, wherein integrating the first account access channel with the first access restriction procedure comprises integrating device identification information associated with the mobile device with the first access restriction procedure;
    integrating, with a computer processor, a third account access channel associated with the user's account with the first access restriction procedure, the third account access channel comprising an online banking account associated with the user's account;
    receiving, with a computer processor, a request from the user to implement the first access restriction procedure via a second account access channel, the second account access channel comprising an online banking interface; and
    based on receiving the request via the second account access channel from the user to implement the first access restriction procedure, implementing, with a computer processor, the first access restriction procedure, wherein implementing the first access restriction procedure comprises (i) disabling access to the user's account via the mobile device and (ii) implementing an authentication procedure that requires secondary authentication before permitting access to the user's account via the online banking account.

12. The method according to claim 11, comprising, based on receiving the request from the user to implement the first access restriction procedure, prompting the user to provide predefined authentication information.

13. The method according to claim 12, comprising receiving the predefined authentication information from the user.

14. The method according to claim 13, wherein implementing the first access restriction procedure is further based on receiving the predefined authentication information from the user.

15. The method according to claim 11, comprising:
- integrating the third account access channel associated with the user's account with a second access restriction procedure;
- receiving a request from the user to implement the second access restriction procedure; and
- based on receiving the request from the user to implement the second access restriction procedure, implementing the second access restriction procedure, wherein implementing the second access restriction procedure comprises restricting access to the user's account via the third account access channel.

16. The method according to claim 11, comprising:
- graphically presenting a first access restriction button to the user via the online banking interface;
- wherein receiving the request from the user to implement the first access restriction procedure comprises determining that the user has engaged the first access restriction button via the online banking interface.

17. The method according to claim 11, comprising terminating the first access restriction procedure after a predefined period of time has elapsed.

18. The method according to claim 11, wherein the mobile device is a mobile phone.

19. The method according to claim 11, wherein the mobile device is a laptop computer.

20. The method according to claim 11, wherein the mobile device is a tablet computer.

\* \* \* \* \*